United States Patent [19] [11] Patent Number: 5,873,039
Najafi [45] Date of Patent: Feb. 16, 1999

[54] CELLULAR TELEPHONE-MODEM INTERFACE FOR DATA COMMUNICATION

[75] Inventor: Hamid Najafi, Los Altos, Calif.

[73] Assignee: Interonics Corporation, Santa Clara, Calif.

[21] Appl. No.: 877,244

[22] Filed: Jun. 17, 1997

Related U.S. Application Data

[63] Continuation of Ser. No. 345,513, Nov. 28, 1994, abandoned.

[51] Int. Cl.$^6$ ..................................................... H04Q 7/32
[52] U.S. Cl. ............................................. 455/454; 379/39
[58] Field of Search .......................... 379/89, 39; 455/454

[56] References Cited

U.S. PATENT DOCUMENTS

| | | |
|---|---|---|
| Re. 34,034 | 8/1992 | O'Sullivan . |
| 4,156,931 | 5/1979 | Adelman et al. ....................... 364/900 |
| 4,658,096 | 4/1987 | West, Jr. et al. . |
| 4,737,975 | 4/1988 | Shafer . |
| 4,775,997 | 10/1988 | West, Jr. et al. . |
| 4,922,517 | 5/1990 | West, Jr. et al. . |
| 5,008,901 | 4/1991 | Wallach et al. ............................. 375/8 |
| 5,020,090 | 5/1991 | Morris . |
| 5,109,403 | 4/1992 | Sutphin . |
| 5,127,041 | 6/1992 | O'Sullivan ................................ 379/59 |
| 5,134,644 | 7/1992 | Garton et al. ............................. 379/39 |
| 5,212,628 | 5/1993 | Bradbury . |
| 5,241,410 | 8/1993 | Streck et al. . |
| 5,249,218 | 9/1993 | Sainton . |
| 5,257,397 | 10/1993 | Barzegar et al. . |
| 5,367,563 | 11/1994 | Sainton .................................... 379/89 |
| 5,629,976 | 5/1997 | Loke et al. . |

OTHER PUBLICATIONS

PCResource, "Cellular Modems promise True Portability", p. 19, Aug. 1990.

Primary Examiner—William Cumming
Attorney, Agent, or Firm—James P. Cleary; Townsend and Townsend and Crew LLP

[57] ABSTRACT

A modem is equipped with both a conventional telephone line interface for attaching to a wired telephone jack and a special interface for connecting to a cellular telephone. The modem interacts with the cellular telephone in accordance with a special protocol, wherein signals of the protocol are derived directly from the conventional modem signals used to interact with the wired telephone jack. No high voltage signals need pass between the modem and cellular telephone. Substitution of the cellular telephone for the wired telephone jack is transparent to the software used to operate the modem. Aside from a connection cable, no special hardware is required between the cellular telephone and modem.

21 Claims, 4 Drawing Sheets

CELLULAR TELEPHONE-MODEM INTERFACE FOR DATA COMMUNICATION

This is a continuation of application Ser. No. 08/345,513, filed Nov. 28, 1994, now abandoned, the disclosure of which is incorporated by reference.

BACKGROUND OF THE INVENTION

The invention relates to interfaces between cellular telephones and modems of the kind used in conjunction with personal computers, particularly portable or "laptop" computers.

With the widespread availability of portable personal computers, low-cost modems, and cellular telephones, the infrastructure necessary for convenient mobile data communication would seem to be in place. The primary obstacle is the difficulty of integrating these components. Modems of the kind typically used with personal computers are intended to physically and electrically interface with the land-based telephone network, not cellular telephones. Cellular telephones, primarily intended for voice communication, often lack data input and output.

Partial solutions for this integration problem exist. One known solution is to eliminate the need to interface with a cellular telephone by providing a wireless modem with an integrated cellular transceiver. This solution is undesirable from a cost standpoint since the hardware necessary for cellular communication is relatively expensive and a user may end up purchasing both a cellular modem and a cellular telephone at great expense and furthermore pay duplicate monthly cellular service fees.

Another known solution is to provide a cellular telephone with a customized data interface intended to interoperate with a special modem installed within the portable computer. One problem with this approach is that the special modem designed for use with the cellular telephone cannot be used over conventional telephone lines, necessitating ownership of at least two modems. Another problem is that special software is required to operate the special cellular-compatible modems. Widely available communication software as well as software intended to run on-line services cannot be used.

Yet another known solution is to provide a hardware interface in a separate physical package which simulates a landline RJ-11 telephone jack to a conventional modem and connects to the data input/output of a cellular telephone. The user, already burdened with carrying a computer and telephone, must then carry this interface also. The interface or the cellular telephone must be able to generate a high-voltage ring signal for input to the modem. Furthermore, modem signals may degrade within this interface, potentially resulting in a loss of data before the cellular network is even reached.

What is needed is simple hardware for integrating cellular telephones and portable personal computers to provide a low-cost and reliable wireless data communication capability. The hardware should support widely-available communications software and should also permit data communication via the conventional telephone network.

SUMMARY OF THE INVENTION

In accordance with the invention, a modem is equipped with both a conventional telephone line interface for attaching to a wired telephone jack and a special interface for connecting to a cellular telephone. The modem of the invention interacts with the cellular telephone in accordance with a special protocol, wherein signals of the protocol are derived directly from the conventional modem signals used to interact with the wired telephone jack. No high voltage signals need pass between the modem and cellular telephone. In accordance with the invention, substitution of the cellular telephone for the wired telephone jack is transparent to the software used to operate the modem. Aside from a connection cable, no special hardware is required between the cellular telephone and modem.

The modem of the invention is equipped with an RS-232 serial port for exchanging data with a computer, a tip/ring interface for connecting to a wired telephone jack, a connector for providing external access to certain modem signals, and a modem controller for generating and receiving modem signals. A specially adapted cellular telephone may be connected to the modem. The modem can then operate through either the wired telephone jack or the cellular telephone.

According to one aspect of the invention, the modem and computer interact via a serial port using modem commands as would be generated by conventional communications software. When the modem is to go on or off hook, it activates a hook signal line to the cellular phone. When the modem goes off hook to begin a dialing sequence, the cellular telephone responds by passing back a simulated dial tone so that the modem "sees" a conventional telephone connection. The cellular telephone determines the number to be dialed by directly monitoring the data output of the computer, ignoring any DTMF tones generated by the modem. Alternatively, a connection may be established by answering a call received by the cellular telephone. The cellular telephone activates a ring input to the modem that would also be activated by the ring circuitry used to detect a ring on the conventional telephone jack. Once a connection is established, the modem translates between analog modem signals transmitted and received by the cellular telephone and data transmitted and received by the computer.

The invention will be better understood by reference to the following detailed description in connection with the accompanying drawings.

DESCRIPTION OF SPECIFIC EMBODIMENTS

Figure 1:
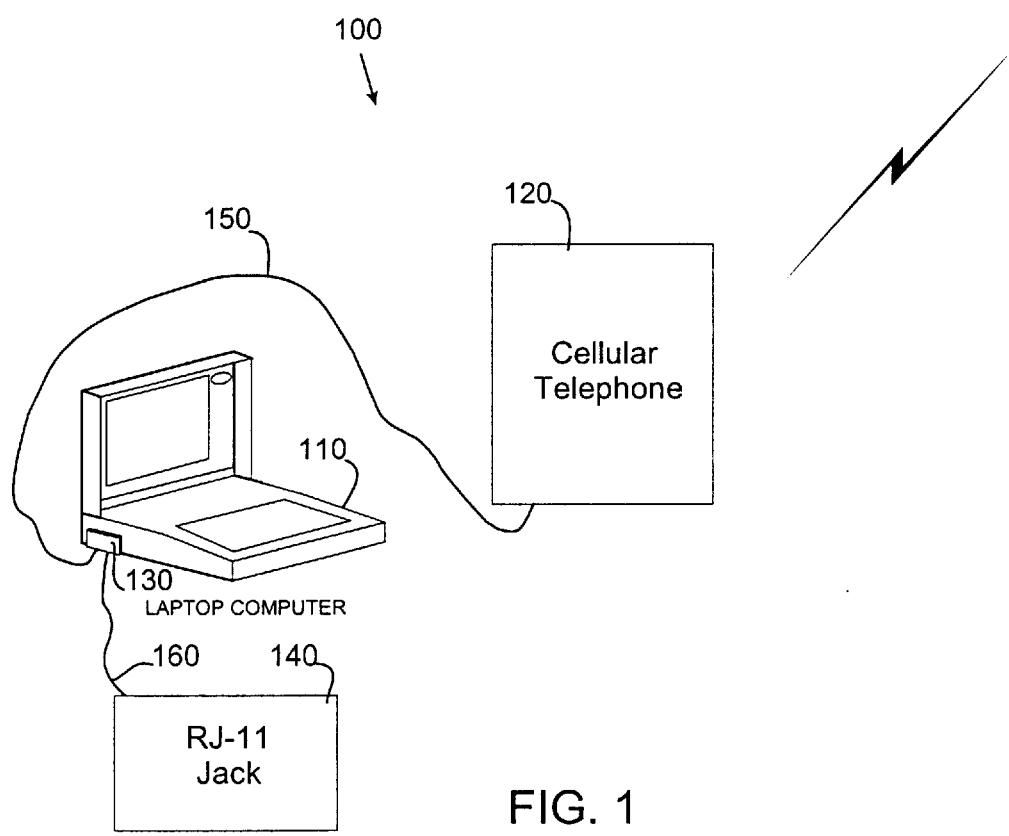
FIG. 1 depicts a mobile data communications installation in accordance with the invention.

FIG. 1 depicts a mobile data communications installation 100 in accordance with the invention. Data communications installation 100 includes a laptop computer 110 and a specially adapted cellular telephone 120. Integrated within the laptop computer 110 is a modem 130. An RJ-11 telephone jack 140 is also depicted to show that, in accordance with the invention, modem 130 may interface with either cellular telephone 120 or a conventional telephone jack. Cables 150 and 160 connect modem 130 to cellular telephone 120 and RJ-11 telephone jack 140 respectively.

In the preferred embodiment, modem 130 is physically packaged as a PCMCIA card inserted within laptop computer 110. Other comparable boards or cards could be substituted. In the preferred embodiment, a 10 pin connector couples modem 130 to cable 150. Modem 130 is coupled to laptop computer 110 via an RS-232 serial port. In the preferred embodiment, modem 130 is a fax/data modem capable of transmitting and receiving data or facsimile information at up to 14400 baud.

Modem 130 operates as a standard wire line modem when connected by cable 160 to RJ-11 telephone jack 140 and as a cellular modem when connected through cable 150 to cellular telephone 120. Standard Windows or DOS-based software running on laptop computer 110 operates modem 130 whether the RJ-11 jack 140 or cellular telephone 120 is being used.

Figure 2:
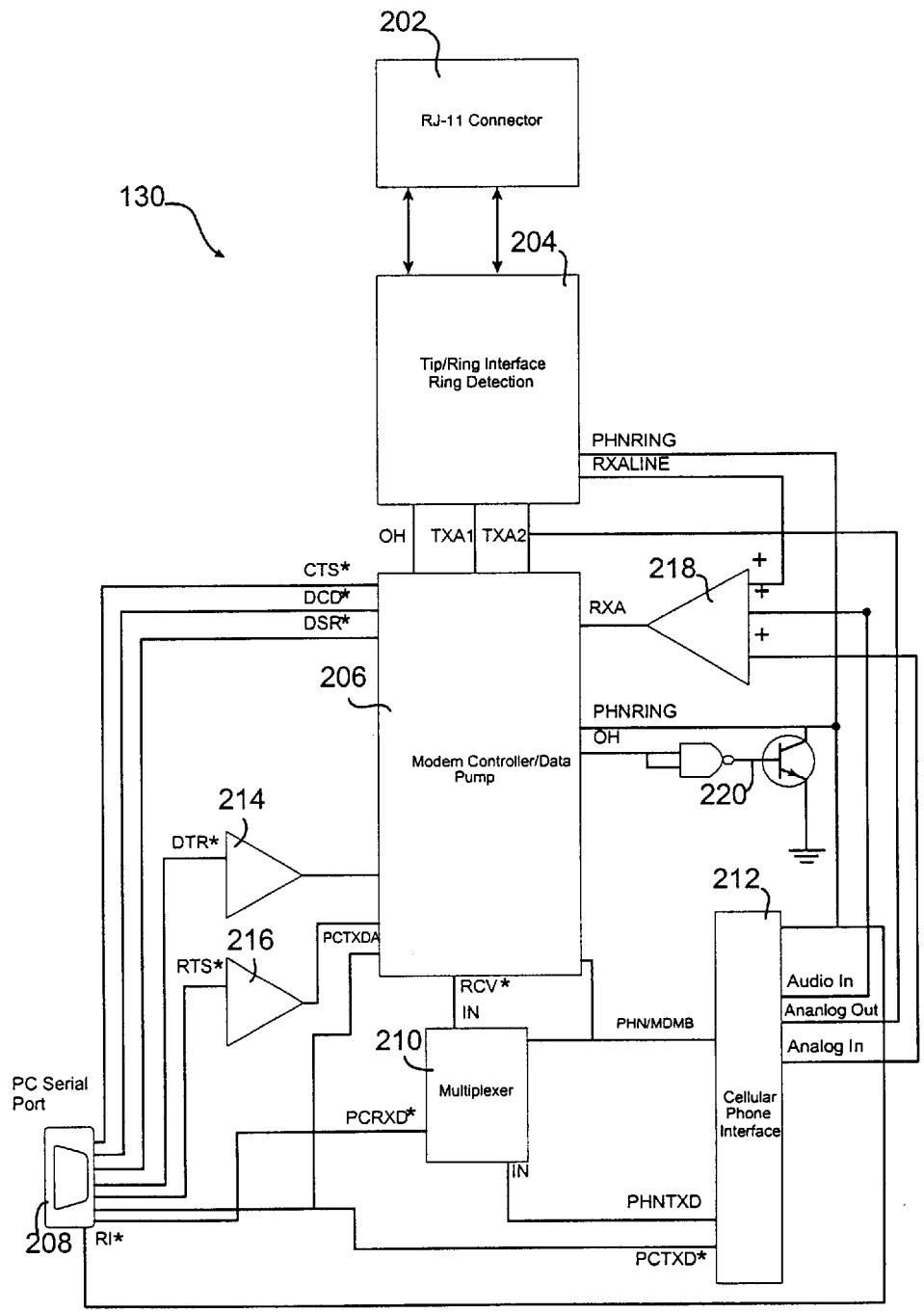
FIG. 2 is a block diagram of the internal circuitry of a modem in accordance with the invention.

FIG. 2 is a block diagram of the internal circuitry of modem 130 in accordance with the invention. FIG. 2 is intended to illustrate how signals within modem 130 are tapped for operation in conjunction with a cellular telephone. Some circuitry known to those of skill in the data communication arts and not relevant to the interfacing features of the invention is omitted. Modem 130 includes an RJ-11 connector 202, a tip/ring interface 204, a modem controller/data pump 206, a PC serial port connector 208, a multiplexer 210, a cellular phone interface connector 212, buffers 214 and 216, a summer 218, and a pull-down circuit 220.

Tip/ring interface 204 operates in accordance with the well-known electrical requirements of the public telephone system. Tip/ring interface 204 receives analog signals from modem controller/data pump 206 on line TXA for transmission to the public telephone network through RJ-11 connector 202. Analog signals received from the public telephone network are output by tip/ring interface 204 onto RXA-LINE. Tip/ring interface 204 incorporates ring detection circuitry and signals a ring on PHNRING. Tip/ring interface 204 goes on hook and off hook responsive to signal line OH.

PC serial port connector 208 provides access to RS-232 signals from a serial port of laptop computer 110. Standard modem output signals CTS* (Clear To Send), DCD* (Data Carrier Detect), and DSR* (Data Set Ready) are received directly from modem controller/data pump 206. Standard modem input signals DTR* (Data Terminal Ready), and RTS* (Ready To Send) pass through buffers 214 and 216 prior to input to modem controller/data pump 206. Modem signal RI* (RING) is obtained from a lowpass filtered version (lowpass filter not depicted) of the PHNRING output of tip/ring interface 204. Signal PCTXD* (Transmit Data) carries data from laptop computer 110 to modem controller/data pump 206. Received data is forwarded to laptop computer 110 over PCRXD*.

In the preferred embodiment, modem controller/data pump 206 includes a Rockwell 2900 series microcontroller, a Rockwell RC144 data pump, and a PROM for storing a modem control program. The data pump modulates and demodulates analog signals while the microcontroller executes a stored program to control modem operations including interpretation of modem dialing commands received over the PCTXD* line and control of data flow in accordance with data communication protocols. In the preferred embodiment, the data pump operates at 14400 baud and includes a fax capability. The details of interconnecting a data pump, microcontroller and miscellaneous support circuitry are known to those of skill in the art and are not described here in detail.

Modem controller/data pump 206 operates under the controls of modem commands generated by communications software programs running on laptop computer 110 such as Procomm, Microphone, etc. Modem commands and data are received from laptop computer 110 over PCTXD*. Modem controller/data pump 206 outputs analog signals onto TXA and receives analog signals on RXA (derived from RXALINE and other signals described below). When an "ATDT" command followed by a telephone number to be dialed is received, modem controller/data pump activates OH to pull tip/ring interface 204 off hook. When a dial tone is received from tip/ring interface 204 via RXA, modem controller/data pump 206 responds by outputting DTMF tones onto line TXA. Once a connection is established, modem controller/data pump 206 extracts data from the analog signal received on RXA and outputs the data through multiplexer 210 onto RCV*. Data received over PCTXD* is modulated onto analog modem signals presented on line TXA for transmission through tip/ring interface 204. In conjunction with the communications software, modem controller/data pump 206 provides auto-answer capabilities by monitoring PHNRING generated by tip/ring interface 204.

In accordance with the invention, specially adapted cellular telephone 120 is interfaced with modem 130 by tapping into the signals described above. The inclusion of cellular phone interface connector 212 does not disturb normal landline modem operation as described above. Furthermore, in the preferred embodiment, cellular phone interface connector 212 carries conventional TTL digital and low-voltage analog signals, not the special signals used for communication over the public telephone network.

Cellular phone interface connector 212 receives data from PC serial port connector 208 on line PCTXD*. Cellular phone interface 212 allows external input of analog signals on AUDIOIN and ANALOGIN which are both lowpass filtered (lowpass filters not depicted) and summed with RXALINE by summer 218 to produce RXA. Line ANALOGOUT of connector 212 provides external access to the analog modem output of line TXA. Line PHNRING is also externally available through connector 212. An additional feature not depicted is that modem 130 provides a 5V power supply through connector 212, permitting cellular telephone 120 to disconnect its battery when attached to the modem.

In the preferred embodiment, OH and PHNRING are multiplexed onto the same signal line. When OH is activated to indicate an off-hook condition, pull-down circuit 220 pulls down line PHNRING, allowing external monitoring of signal OH through line PHNRING.

Line PHN/MDMB is normally pulled low by modem controller/data pump 206 and is used by cellular telephone 120 to verify connection through connector 212. When cellular telephone 120 detects connection, it changes its display to read "EXTERNAL MODEM" and disables its microphone and speaker. PHN/MDMB also acts as the select signal for multiplexer 210. In the preferred embodiment, multiplexer 210 always selects signal RCV* from modem controller/data pump 206 for output onto PCRXD*. However, multiplexer 210 provides a capability for transferring data directly from the cellular phone connector 212 to PCRXD* by altering select signal PHN/MDMB.

Figure 3:
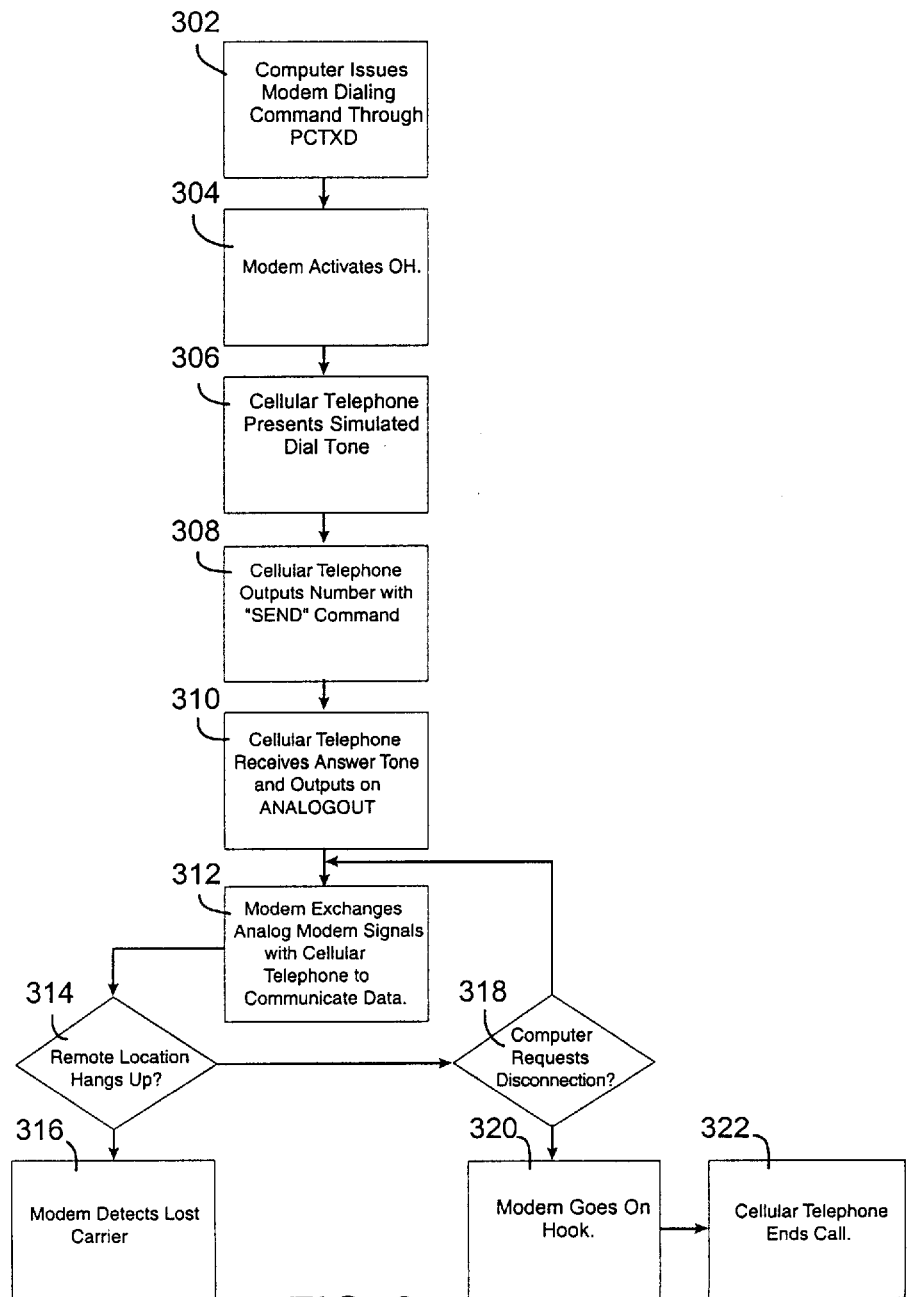
FIG. 3 is a flowchart describing the steps of operating a remote data communication link requested by the computer in accordance with the invention.

FIG. 3 is a flowchart describing the steps of operating a remote data communication link requested by the computer 110 in accordance with the invention. At step 302, communications software running on laptop computer 110 issues a modem dialing command, "ATDT" followed by a number N through PCTXD*. At step 304, modem controller/data pump 206 responds by activating signal OH, thus pulling down PHNRING. At step 306, cellular telephone 120 connected to connector 212 responds to the pulling down of PHNRING by presenting a simulated dial tone, a 400 Hz square wave, on AUDIOIN. The simulated dial tone reaches modem controller/data pump 206 on line RXA through summer 218. Modem controller/data pump 206 responds by outputting DTMF tones on line TXA. These tones reach cellular telephone 120 by way of ANALOGOUT but cellular telephone 120 ignores these tones and instead responds to the telephone number as monitored on PCTXD*. At step 308, cellular telephone 120 outputs the number together with a "SEND" command to the cellular telephone network. At step 310, cellular telephone 120 receives an answer tone from the remote location and outputs it onto ANALOGOUT.

At step 312, once a connection is established, modem controller/data pump 206 translates data received over PCTXD into analog modem signals on line TXA which is then captured by cellular telephone 120 from ANALOGOUT and transmitted to the remote location over the cellular network. Similarly, cellular telephone 120 receives analog modem signals from the remote location and outputs them onto ANALOGIN which is summed into the RXA input of modem controller/data pump 206. Modem controller/data pump 206 demodulates the analog signal on RXA and forwards the recovered data to its RCV* output which is relayed by multiplexer 210 to PCRXD*.

The connection may be terminated by either party hanging up. If the remote location hangs up at step 314, analog input onto ANALOGIN ceases and modem controller/data pump 206 notes the loss of carrier on RXA and notifies the communications software via RCV* and PCRXD* at step 316. If the communications software running on computer 110 wishes to end the connection, a standard modem disconnection command is sent through PCTXD* at step 318. Modem controller/data pump 206 responds by de-activating OH at step 320. Cellular telephone 120 responds at step 322 by ending the call.

Figure 4:
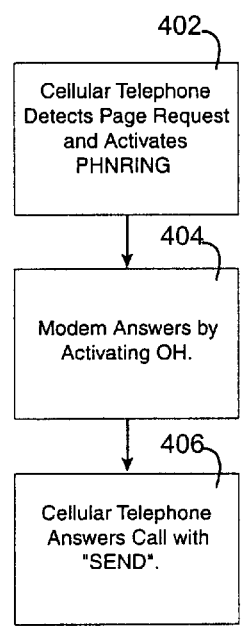
FIG. 4 is a flowchart describing the steps of establishing a remote data communication link requested by a remote location in accordance with the invention.

FIG. 4 is a flowchart describing the steps of establishing a data communication link requested by a remote location in accordance with the invention. At step 402, cellular telephone 120 detects that it is being addressed with a page request and activates the PHNRING line, pulling it low with the same cadence as a standard ring signal, 3 seconds off and 1 second on. Modem controller/data pump 206 then responds at step 404 by activating OH. As noted before, OH pulls PHNRING low so cellular telephone 120 detects the off-condition by monitoring PHNRING during the off period of the ringing signal and at step 406 sends a "SEND" message to the cellular network to answer the call. Communication then proceeds as described in reference to FIG. 3.

Thus, modem controller/data pump 206 and the communication software of laptop computer 110 need not change their operation to accommodate cellular telephone 120. Instead, the circuitry of FIG. 3 is configured so that cellular telephone 120 may transparently monitor and alter the conventional modem signals. For improved performance, the parameters of the standard communications program should be altered to accommodate the special requirements of wireless communications. For example, the carrier loss detect time should be lengthened and MNP-10 or some other error protection protocol should be activated, if available.

This approach has important advantages in that it permits the use of powerful communications programs that have been developed for a mass market. This includes software used to operate on-line services such as America On-Line, Compuserve, Prodigy etc. In the prior art approach, it was necessary to use a customized communications program particularized for the cellular telephone. Of course, a customized package developed for this narrow application will not have all the desirable features of the mass market packages.

The invention has now been explained with reference to specific embodiments. Other embodiments will be apparent to those of ordinary skill in the art in view of the foregoing description. It is therefore not intended that this invention be limited except as indicated by the appended claims.

What is claimed is:

1. A method for operating a data communication link between a data processing system and a remote location accessible via a cellular telephone, said data processing system having a serial port connection including a first data line carrying data from the data processing system, and a second data line carrying data to the data processing system, said data processing system coupled to a modem via said serial port, said modem including a tip/ring interface for connecting to a wired telephone jack and a connector, said connector providing external access to said first data line, to one or more analog inputs of said modem, an off-hook signal output of said modem and an analog output of said modem, said cellular telephone including a modem interface coupled to said connector, said method comprising the steps of:

issuing through said first data line a modem dialing command including a telephone number of said remote location; thereafter receiving, using said modem, said modem dialing command via said first data line; thereafter responding to said modem dialing command by activating said off-hook signal output; thereafter responding, using said cellular telephone, to said activated off-hook signal output by outputting a simulated dial tone onto one of said one or more analog inputs; thereafter dialing, using said cellular telephone, said telephone number as received via said first data line to initiate a call; thereafter receiving, using said cellular telephone, an answer tone from said remote location; thereafter outputting, using said cellular telephone, said answer tone to one of said one or more analog inputs; thereafter translating, using said modem, data received from said first data line into analog modem output signals for transmission onto said analog output;

transmitting, using said cellular telephone, said analog modem output signals from said analog output to said remote location;

receiving, using said cellular telephone, analog modem input signals from said remote location;

transmitting, using said cellular telephone, said analog modem input signals to one of said one or more analog inputs; and translating, using said modem, said analog modem input signals into digital data for transmission onto said second data line.

2. The method of claim 1 further comprising the steps of:

issuing a hang-up command to said modem through said first data line; thereafter de-activating, using said modem, said off-hook signal output in response to said hang-up command; and thereafter ending, using said cellular telephone, said call responsive to deactivation of said off-hook signal.

3. The method of claim 1 further comprising the steps of:

ending, using said cellular telephone, said call after disconnection at said remote location, thereby terminating input to said analog input; and thereafter activating, using said modem, said off-hook signal responsive to termination of input to said analog input.

4. A method for operating a data communication link between a data processing system and a remote location accessible via a cellular telephone, said data processing system having a serial port connection including a first data line carrying data from the data processing system, and a second data line carrying data to the data processing system, said data processing system coupled to a modem via said serial port, said modem including a tip/ring interface for connecting to a wired telephone jack and a connector, said connector providing external access to said first data line, to one or more analog inputs of said modem, an off-hook signal output of said modem, a ring detection input to said modem and an analog output of said modem, said cellular telephone including a modem interface coupled to said connector, said method comprising the steps of:

receiving, using said cellular telephone, a page message from said remote location;

activating, using said cellular telephone, said ring detection input responsive to said page message in accordance with timing of a ring signal; and thereafter activating, using said modem, said off-hook signal output responsive to activation of said ring detection input.

5. A modem for integrated interfacing with both wireless and wired connections to a public telephone system, said modem comprising:

serial port means for exchanging data with a data processing system including a first data line carrying data from said data processing system and a second data line carrying data to said data processing system;

tip/ring interface means for connecting to a wired telephone jack, said tip/ring interface means including ring detection means for activating a ring detection line responsive to a ring received by said tip/ring interface means;

modem controller means coupled to said serial port means and to said tip/ring interface means, said modem controller means comprising 1) means for receiving analog modem signals from said tip/ring interface means and an analog input distinct from said tip/ring interface means, 2) means for translating said received analog modem signals into digital data for output onto said second data line, 3) means for receiving digital data from said first data line, and 4) means for translating digital data received from said first data line into analog modem signals for output onto said tip/ring interface means and an analog output distinct from said tip/ring interface means, said modem controller means operating responsive to modem command data received via said first data line;

connector means for coupling to a cellular telephone interface, said connector means being coupled to said modem controller means, to said ring detection means, and to said serial port means, said connector means providing external access to said first data line, to said ring detection line, to said analog input, and to said analog output; and a cellular telephone coupled to said cellular telephone interface, said cellular telephone controlling said ring detection means and whereupon detecting an off-hook condition passes to said modem controller via said cellular telephone interface a simulated dial tone and wherein said cellular telephone sends and receives low voltage analog signals; and wherein said wired telephone jack and said connector both exchange analog modem signals with said modem controller means thereby providing access to said public telephone system via both wired and wireless interfaces.

6. The apparatus of claim 1, wherein, when operating said modem controller to communicate data via said wired telephone jack, said data processing system uses modem dialing commands that are identical to modem dialing commands used by said data processing system when operating said modem controller to communicate data via said cellular telephone.

7. The modem of claim 5, wherein, when operating said modem controller to communicate data via said wired telephone jack, said data processing system uses modem dialing commands that are identical to modem dialing commands used by said data processing system when operating said modem controller to communicate data via said cellular telephone.

8. An apparatus for integrated interfacing with both wireless and wired connections to a public telephone system, said apparatus comprising:

a port for exchanging data signals with a data processing system;

a first interface for connecting to a wired telephone jack, said first interface including a ring detection circuit that generates a ring detection signal responsive to a ring received by said first interface;

a second interface for connecting to a wireless telephone system, wherein said second interface also generates said ring detection signal;

a modem circuit connected to said port, said first interface, and said second interface, for exchanging telephone signals with said first and second interfaces and data signals with said port so that said data processing system communicates data with said wired telephone jack via said first interface and with said wireless telephone system via said second interface; and a cellular telephone coupled to said second interface, said cellular telephone controlling said ring detection circuit and whereupon detecting an off-hook condition passes to said modem circuit via said second interface a simulated dial tone, and wherein said cellular phone sends and receives digital and low-voltage analog telephone signals to an from said wireless telephone system.

9. The apparatus of claim 1, wherein:

one of said telephone signals is an off-hook signal, said off-hook signal indicating when said modem circuit goes on-hook and off-hook; and the apparatus further comprises means for allowing the second interface to monitor the off-hook signal.

10. The apparatus of claim 9, wherein the means includes a pull-down circuit that pulls down one of said at least one of said telephone signals when the off-hook signal is activated.

11. The apparatus of claim 8, wherein:
said at least one of said telephone signals includes said ring detection signal.

12. The modem of claim 8 wherein said data signals are low voltage analog signals.

13. The apparatus of claim 8, wherein said port further comprises a serial port for exchanging data with said data processing system including a first data line carrying data from said data processing system and a second data line carrying data to said data processing system.

14. The apparatus of claim 13, wherein said first interface is a tip/ring interface for connecting to said wired telephone jack, said tip/ring interface further including a ring detection circuit that activates a ring detection line responsive to a ring received by said tip/ring interface.

15. The apparatus of claim 14, wherein said modem circuit further comprises a modem controller coupled to said port and to said first interface, said modem controller receiving said analog modem signals from said first interface and an analog input distinct from said first interface, forming a part of said second interface, translating said received analog modem signals into digital data for output onto said second data line, receiving digital data from said first data line, and translating digital data received from said first data line into analog modem signals for output onto said first interface and an analog output forming another part of said second interface, said modem controller operating responsive to modem command data received via said first data line.

16. The apparatus of claim 15 wherein said second interface is coupled to said modem circuit, to said ring detection circuit, and to said serial port, said second interface providing external access to said first data line, to said ring detector line, to said analog input, and to said analog output.

17. The apparatus of claim 14 wherein said wired telephone jack is an RJ-11 jack.

18. The apparatus of claim 14 wherein said ring detection line is coupled to a ring input of said serial port.

19. The apparatus of claim 15 wherein input from said tip/ring interface is summed with said analog input.

20. The apparatus of claim 16 wherein said second interface includes an off-hook signal line coupled to said modem controller, said off-hook signal line indicating when said modem goes on-hook and off-hook.

21. The apparatus of claim 13 wherein said serial port is an RS-232 serial port.

* * * * *